United States Patent Office 3,175,005
Patented Mar. 23, 1965

3,175,005
PREPARATION OF QUATERNARY AMMONIUM NITRITES
Murray C. Cooperman, Chicago, Ill., assignor to Armour and Company, Chicago, Ill., a corporation of Delaware
No Drawing. Filed Oct. 9, 1961, Ser. No. 143,601
7 Claims. (Cl. 260—567.6)

The invention relates to the preparation of quaternary ammonium nitrites, and more particularly to a process in which the nitrite is produced with a minimal amount of chloride contamination.

An object of the invention is to provide a process for the production of quaternary ammonium nitrites in which the chloride salt content is greatly reduced. A further object is to provide a method and means by which the nitrite product can be produced at lower temperatures and pressure than in prior operations, resulting in a lighter quaternary nitrite with a low order of chloride ion content. Yet another object is to provide a process in which the quaternary ammonium chloride salt is added slowly and progressively as the formed sodium chloride precipitates out and increases the solubility of the sodium nitrite for further reaction. Other specific objects and advantages will appear as the specification proceeds.

In one embodiment of the invention, a slurry of sodium nitrite in a substantially non-aqueous solvent, such as methanol, is heated to increase the solubility of sodium nitrite in the solvent. A quantum of quaternary ammonium chloride is introduced into the slurry, and as the exchange reaction occurs, the sodium chloride formed precipitates out due to its negligible solubility in the solvent, and the net result is a further solubility of sodium nitrite and a further reaction. If water were present, as in prior practices where water was introduced to effect solution of the sodium nitrite, the increased solubility of sodium chloride would prevent further reaction. In the present process, however, the remaining quaternary ammonium chloride is added incrementally or at a slow rate with stirring to produce a final product having a very low chloride ion content.

In the process, I prefer to mix the sodium nitrite and the solvent at a temperature of 60–70° C., followed by slow addition of the quaternary ammonium chloride salt. By mixing the sodium nitrite and methanol at the low temperature of 60–70° C. and stirring into the mixture the quaternary ammonium chloride salt, I find that there is a more rapid reaction rate in that the chloride content drops very substantially within a period of two hours or less.

The quaternary ammonium chloride may be formed in any desired manner from high molecular weight fatty amines, and I prefer to employ amines derived from fatty acids of coco, soya or tallow origin having from 8 to 18 carbon atoms.

Any substantially non-aqueous solvent may be utilized, such as, for example, alcohol containing 1 to 4 atoms, dimethyl formamide, etc. I prefer to employ methanol.

In a specific illustrative procedure, I heat a slurry of sodium nitrite in 20% molar excess with methanol at a temperature of 60–70° C., and a quantity of warmed quaternary ammonium chloride is dropped into the slurry and stirred vigorously. As the exchange reatcion occurs, the sodium chloride formed precipitates out, resulting in a further solubility of sodium nitrite and a further reaction. By adding the remaining quaternary ammonium chloride slurry through a period of two hours, more or less, I obtain a more rapid reaction rate and the chloride content drops substantially, as indicated in the specific example set out hereinafter.

Specific examples of the process may be set out as follows:

*Example I*

To a stirring suspension of 415 gms. of sodium nitrite (0.6 mol) in 520 gms. of methanol, which is maintained at 60–70° C., there is added 2,960 gms. of warmed (50–60° C.) quaternary ammonium chloride (Arquad 2C–75) (0.5 mol) over 1–1½ hours. The temperature during the addition is maintained at 60–70° C. and is efficiently stirred. When the addition of the quaternary ammonium chloride is completed, the reaction mixture is stirred at 70–80° C. for an additional two hours. A sample of the reaction mixture is cooled to room temperature, filtered of salts, and analyzed for chloride ion by the Volhard method. The resulting product is a light yellow amber liquid, and the chloride ion content is less than 0.8%. The batch is then stirred and cooled to 20° C.; then filtered through a pressure filter. 3,144 gms. of a light yellow amber liquid are obtained. Analysis of the finished product gave:

Percent chloride ion _____ 0.512
Percent nitrite activity _____ 62.0
Percent total activity _____ 68.6
FAC _____ 17–19
Ash _____ 0.712

*Example II*

A slurry of 45.5 gms. sodium nitrite (0.66 mol) and 95 gms. of methanol was stirred vigorously at 65–70° C. with 23 gms. of Arquad C (quaternary ammonium chloride derived from fatty acids of coco in isopropanol). The remaining 204 gms. of the quaternary ammonium chloride salt were warmed to 50° C., added to the stirring reaction mixture at 65–70° C. over a period of two hours, and stirred another two hours at 70–80° C. The batch was filtered at 50° C., using filter aid. The yield consisted of 261 gms. of amber clear solution having the following analysis:

Percent activity _____ 43.8
Percent chloride ion _____ 0.88
Nitrite activity _____ 41.0
FAC _____ 11 C
Ash _____ 0.41
Gardner _____ 12–13

*Example III*

41.5 gms. NaNO$_2$ in 52 gms. of methanol and with 296 gms. of quaternary ammonium chloride (Arquad 2C) were heated at 70–80° C. for two hours, giving a chloride residue of 3.77. Even after 20 hours at 70–80° C., the reaction had not reached its maximum equilibruim point.

Using the same reactants and solvents in a separate test, but mixing the NaNO$_2$ and methanol at 60–70° C., followed by slow addition of the quaternary ammonium chloride, gave a more rapid reaction rate in that the chloride content dropped to 0.76% in two hours.

*Example IV*

41.5 gms. of NaNO$_2$ in 111 gms. of methanol were mixed together and heated at 60–70° C., followed by slow addition of 333 gms. of Arquad 2HT (prepared from amines derived from hydrogenated tallow fatty acids). The nitrite activity was 59.0, and the chloride content was .66.

While in the foregoing specification I have set forth specific procedural steps in considerable detail for the purpose of illustrating embodiments of the invention, it will be understood that such detail or details may be varied widely by those skilled in the art without departing from the spirit of my invention.

I claim:
1. In a process for preparing quaternary ammonium nitries having a low chloride content, the steps of mixing sodium nitrite with methanol at a temperature of about 60–70° C., and then slowly adding quaternary ammonium chloride salt as sodium chloride is precipitated, and finally recovering the resulting quaternary ammonium nitrite, said process being carried out in substantially non-aqueous media.

2. The process of claim 1 in which the quaternary ammonium chloride salt is warmed to about the temperature of the sodium nitrite and methanol mixture as it is added to the mixture.

3. The process of claim 1 in which the reaction mixture, after the addition of quaternary ammonium chloride salt is completed, is maintained at a temperature of 70–80° C. before the separation of the quaternary ammonium nitrite.

4. In a process for the preparation of quaternary ammonium nitrites having a low chloride content, the steps of forming a slurry of sodium nitrite in methanol at a temperature of about 60–70° C., adding thereto a relatively small amount of quaternary ammonium chloride salt, stirring the mixture, adding further amounts of the quaternary ammonium chloride salt in increments over a period of one to two hours until the addition of quaternary ammonium chloride salt is completed, stirring the mixture for a further period at a temperature of 70–80° C., and separating the liquid from the precipitated salts, said process being carried out in substantially non-aqueous media.

5. The process of claim 4 in which the reaction mixture is cooled to room temperature, and then filtered to remove the salts.

6. In a process for the preparation of quaternary ammonium nitrites having a low chloride content, the steps of heating a slurry of sodium nitrite in about 20% molar excess with methanol, introducing a minor portion of the quaternary ammonium chloride into the slurry, stirring the mixture vigorously as the exchange reaction occurs, and then adding the remainder of the quaternary ammonium chloride salt at a slow rate to the slurry as the sodium chloride formed precipitates out of the slurry, said process being carried out in substantially non-aqueous media.

7. In a process for preparing quaternary ammonium nitrites having a low chloride content, the steps of mixing sodium nitrite with a substantially non-aqueous solvent selected from the group consisting of alcohol containing from 1 to 4 carbon atoms and dimethyl formamide, at a temperature of about 60 to 70° C. and then slowly adding quaternary ammonium chloride salt to the nitrite-solvent mixture, and finally recovering the resulting quaternary ammonium nitrite, said process being carried out in substantially non-aqueous media.

References Cited in the file of this patent
UNITED STATES PATENTS

| | | |
|---|---|---|
| 2,449,962 | Wachter et al. | Sept. 21, 1948 |
| 2,635,116 | Wolfe et al. | Apr. 14, 1952 |
| 2,692,285 | Robinson | Oct. 19, 1954 |
| 2,767,178 | Mellick | Oct. 16, 1956 |

FOREIGN PATENTS

| | | |
|---|---|---|
| 180,359 | Austria | Dec. 10, 1954 |
| 735,631 | Great Britain | Sept. 27, 1950 |